Figure 1:
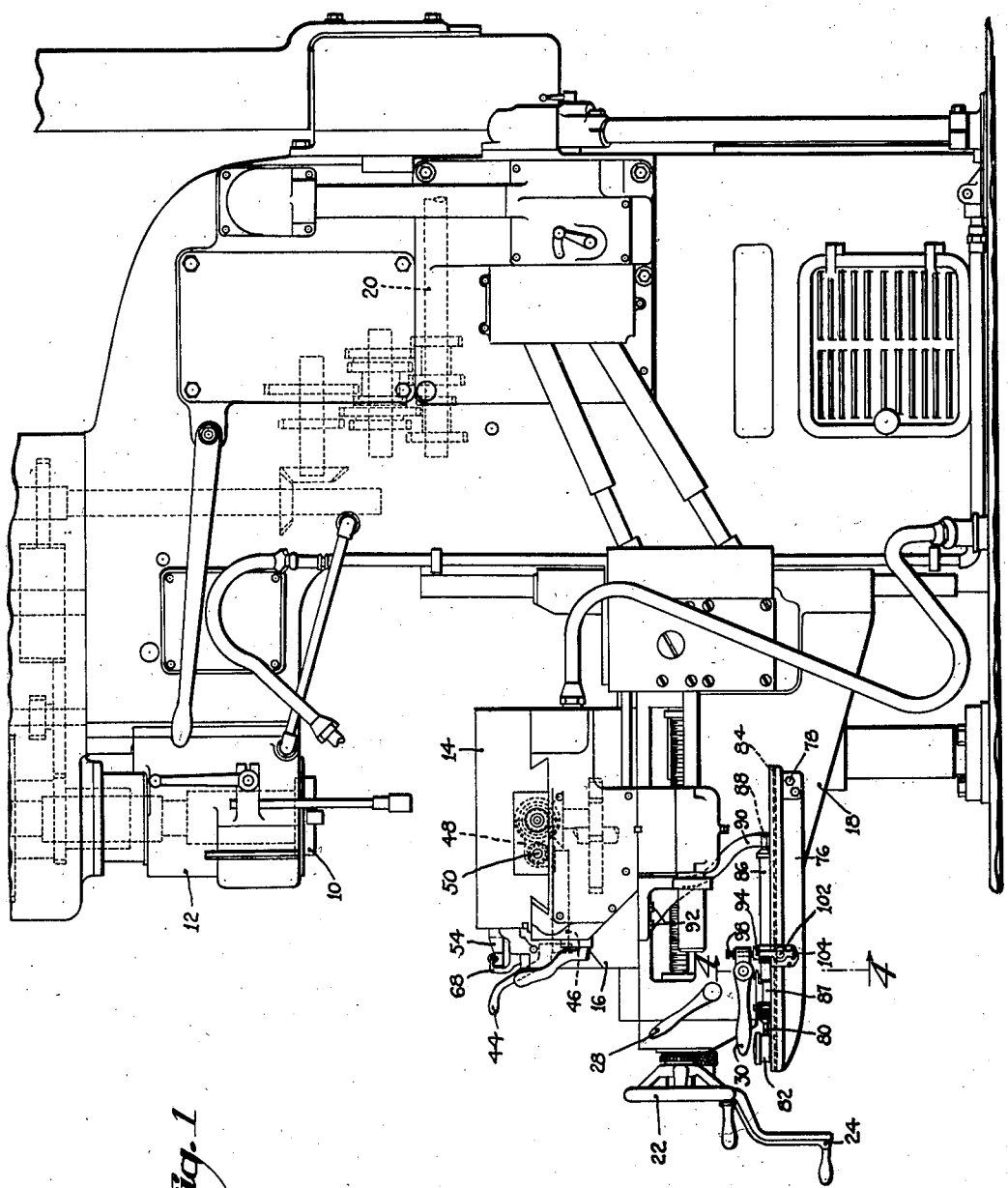

Jan. 2, 1934.   B. P. GRAVES ET AL   1,942,209
MACHINE TOOL
Filed July 6, 1932    3 Sheets-Sheet 3

Patented Jan. 2, 1934

1,942,209

UNITED STATES PATENT OFFICE 1,942,209

MACHINE TOOL

Benjamin P. Graves, Cranston, and Arthur F. Bennett, West Barrington, R. I., assignors to Brown and Sharpe Manufacturing Company, a corporation of Rhode Island Application July 6, 1932. Serial No. 621,044

11 Claims. (Cl. 90—21)

The present invention relates to improvements in machine tools, and more particularly to machines of a general class which include a tool support and a supporting unit for the work comprising one or more supports movable to position the work with relation to the tool together with a hand and a power feed for each of said supports. More specifically the present invention is concerned with the provision of a novel and improved micrometer attachment for use with a machine of this type to enable the operator to accurately gage and control the relative movements of said supports to secure a precise adjustment in the position of the work with relation to the operating tool or tools.

A micrometer attachment of the type referred to, comprises generally a yielding stop which is mounted on one of two relatively movable supports, an indicator dial graduated to measure the movement of the stop, a corresponding fixed stop mounted on the other of said supports, and a holder to receive one or more standard length bars and a micrometer gage to enable an extremely accurate measurement to be made of the relative movements of the supports. When the machine is to be set up for certain classes of work, as for instance where a number of holes are to be bored having an exact relationship to each other, the attachment above referred to is rigidly clamped in position in the machine, and the hand feed is then utilized to bring the work to the required operating position with relation to the operating tool, the distance between the two stops being measured exactly by means of the measuring bars and micrometer gage above referred to. Further adjustments in the position of the work are secured by varying the arrangement of the standard length measuring bars and micrometer gage to add or subtract a length which will correspond exactly to the change in position of the work, the supports in each case being moved relatively to each other by hand to bring the stops and intervening bars into engaging contact.

With the attachment set up in operative position in the machine, it will readily be seen that the engagement of the stops and intervening bars provides a positive check to the further relative movement of the supports. Further movement of the supports, as for instance, if the support were operating under power feed, must therefore inevitably result in destroying the attachment or in injury to the machine. A considerable responsibility therefore rests upon the operator to prevent the engagement of the power feed for the support to cause interference with the attachment and consequent damage to the parts.

The principal object of the present invention is to provide means which will act when a removable micrometer attachment of this general description is set up in operative position in the machine for gaging and controlling the position of a support to prevent the engagement of the corresponding power feed for said support.

With this and other objects in view, as may hereinafter appear, a principal feature of the invention consists in the provision of an attachment of this general description which is constructed and arranged so that when it is set up in operative position in the machine, it will act to maintain the power feed for said support out of operation.

Figure 2:
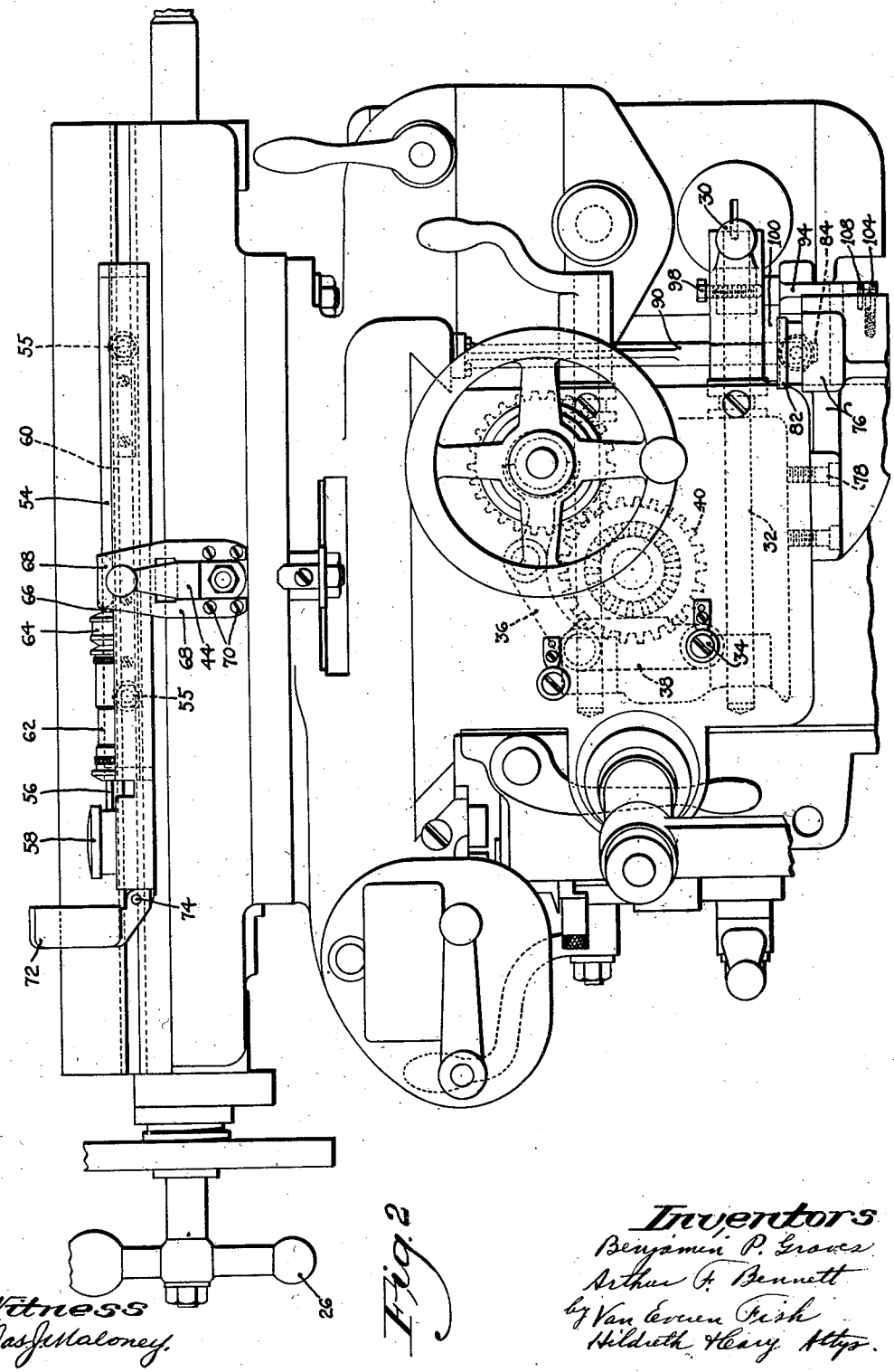
Figure 3:
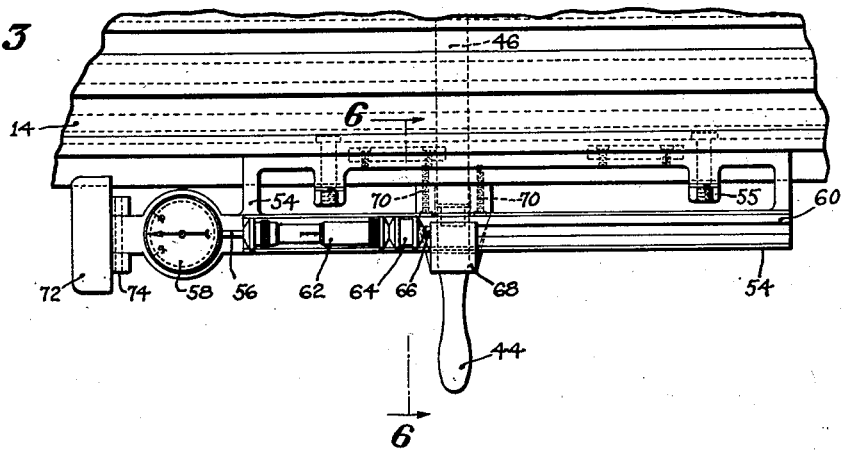
Figure 4:
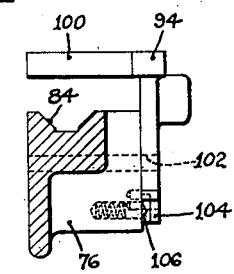
Figure 5:
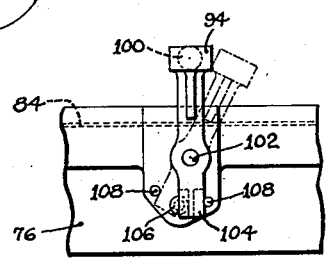
Figure 6:
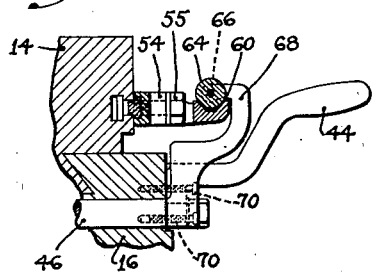

The several features of the invention consist also in the devices, combination and arrangement of parts hereinafter described and claimed, which together with the advantages to be obtained thereby, will be readily understood from the following description taken in connection with the drawings, in which Fig. 1 is a view in right side elevation of a vertical milling machine embodying the several features of the invention; Fig. 2 is an enlarged view in front elevation of a portion of the machine including the table, saddle and knee; Fig. 3 is a partial plan view of the table and the micrometer attachment for gaging the position of the table; Fig. 4 is a detail section taken on the line 4—4 of Fig. 1, to illustrate particularly a mechanism for locking the saddle power feed control lever out of operation; Fig. 5 is a side elevation of substantially the parts shown in Fig. 4; and Fig. 6 is a section taken on the line 6—6 of Fig. 3.

The vertical milling machine herein described as embodying in a preferred form the several features of the invention, comprises a vertical milling spindle indicated at 10, a machine column 12 on which the spindle is mounted, a longitudinally movable work supporting table 14, a transversely movable saddle 16, and a vertically movable knee 18. The drive for the spindle is taken from the horizontal drive shaft 20 in the machine column, and is transmitted to the spindle through a train of mechanism including change speed gears mounted in the machine column as generally indicated in dotted lines in Fig. 1. The work supporting table, saddle and knee of the present machine may be operated through a hand feed or power feed transmission at a plurality of normal and quick traverse rates. The arrangement of the table, saddle and knee, and the hand and power feeds therefor, are identical with those shown in the copending application of Graves and Bennett, Serial No. 181,050, filed April 5, 1927, for improvements in Milling machines, to which reference may be had for a more complete disclosure and description of the machine.

The control levers for controlling the hand and power feeds for the table, saddle and knee, are substantially the same, and have substantially the same location on the machine as shown in the application above referred to. The hand feed controls for operating the table, saddle and knee by hand from the front of the machine, comprise a hand wheel 22 which operates the saddle feed, a hand lever 24 for the knee feed, and a crank 26 located at one end of the table for operating the table by hand. As in the machine above referred to, a single reverser is provided for the saddle and knee controlled by a vertical hand lever 28, and secondary clutches are provided for operatively connecting the power feeds for the saddle and knee controlled from a single horizontally located lever arm 30. As shown in Fig. 2 of the drawings, the power clutch lever 30 for the saddle and knee is mounted on a cross shaft 32 which is provided with a pinion arranged to mesh with a rack formed in a rearwardly extending control rod 34. A clutch shifting yoke generally indicated at 36 in Fig. 2 secured to the control rod 34, is arranged to engage with and control the position of the secondary clutch for connecting the saddle power feed. A clutch shifting yoke 38 secured to the control rod 34 is arranged to engage with a gear 40 to control the position of the secondary clutch for the knee power feed. These parts are arranged so that upward movement of the control lever from its neutral position will act to engage the secondary clutch for the saddle power feed, whereas a corresponding downward movement of the lever 30 will act to engage the secondary clutch for the knee power feed. For controlling the power operation of the table, a vertical hand control lever 44 is provided which is mounted on the forward end of a short rock shaft 46 (see Fig. 1) mounted in the saddle, and at its rear end provided with a pinion arranged to engage with a corresponding rack formed in a sliding clutch yoke 48. The yoke 48 is slidably mounted on a bar 50, and is arranged to engage with a reverser of usual construction, which is moved in either direction by the movement of the control lever 44 from its neutral central position to engage the table power feed to drive the table in the desired direction.

In accordance with the present invention, micrometer attachments are provided for positioning the table 14 and saddle 16 to secure an accurate adjustment in the position of the work with relation to the operating tools which are constructed and arranged to automatically lock the power feeds for the respective supports out of operation when mounted in operative position in the machine. The attachment for controlling the position of the table 14 comprises a bracket 54 which is clamped in position on the side of the table 14 by means of clamping screws 55, and has mounted thereon a yielding stop 56 and an indicator dial 58 calibrated to give a direct reading of the movement of the stop 56. There is also formed on the bracket 54 a groove or holder 60 arranged to receive a micrometer gage such as that indicated at 62 in the drawings, and one or more standard length bars 64. Cooperating with the stop 56 is a fixed stop 66 which is formed on the upper end of a bracket 68 secured to the saddle 16 by means of clamping screws 70, and extending into the path of the stop 56 and the bars 64 in the groove or holder 60. For the protection of the indicator dial 58 when not in use, a cover 72 is provided hinged at 74 on the bracket 54 to enable the cover readily to be opened or closed.

In order to prevent any possibility of the operation of the power feed for the table and injury to the micrometer attachment while set up in operating position in the machine, the attachment is constructed and arranged, when clamped in position, to automatically lock the power feed for the table out of operation. To this end the bracket 68 on which the fixed stop 66 is mounted, takes the form of a yoke which is clamped in position on the saddle to engage with and rigidly secure the table power feed lever 44 in its neutral position against movement in either direction.

As shown in Figs. 1, 4 and 5 of the drawings, a similar micrometer attachment is provided for controlling the position of the saddle, and comprises a bracket 76 which is secured by means of clamping screws 78 to the knee 18, and carries a yielding stop 80 and indicator dial 82 for measuring the movement of the stop with relation to the bracket. A groove or holder 84 formed on the bracket 76 extends rearwardly in the direction of movement of the saddle 16, and is arranged to receive one or more standard length bars 86, and a micrometer 87 as illustrated in Fig. 1. Cooperating with the yielding stop 80 is a stop 88 formed on a downwardly extending bracket 90 rigidly secured by means of screws 92 to the saddle 16.

In order to prevent any possibility of engagement of the power saddle feed while the attachment for gaging the position of the saddle is in operating position in the machine, a detent 94 is provided which is arranged to engage under a set screw 98 adjustably mounted in a rearwardly extending arm of the control lever 30 for the knee and saddle feeds to lock the control lever 30 against the movement about its pivot in a direction to engage the saddle power feed. With the construction shown in the drawings, the stops 80 and 88 are mounted wtih relation to each other on adjacent portions of the saddle and knee, so that they will not be brought into contact with each other for even the most extreme forward movement of the saddle before the saddle power feed is disconnected by the usual safety stops. It is therefore necessary and desirable to lock the saddle power feed out of operation only when a micrometer gage 87 or one or more standard length bars are in position in the holder 84 to prevent possible interference and breakage of parts. To provide a positive lock for the power saddle feed lever 30 when the micrometer attachment for the saddle is set up in operating position with the micrometer gage 87 and bars 86 in position in the holder 84, the detent 94 is pivotally mounted on the bracket 76 and is provided at its upper end with a laterally offset nib 100 which extends over the groove or holder 84 and is arranged to permit the insertion of a bar or a micrometer gage under the nib 100 only when the detent 94 is in a vertical position. The detent 94 is secured intermediate its length to a rock shaft 102 journalled in the bracket 76, and at its lower end is provided with an angular projecting portion 104 which is arranged to be engaged by a conical-shaped spring-pressed plunger 106 mounted in a recess in the bracket 76 to hold the detent yieldingly in one of two alternative positions illustrated in Fig. 5. The movement of the detent 96 in either direction past the spring-pressed plunger 106 is limited by means of two pins 108 mounted in the bracket 76. With this arrangement of the parts it will be seen that in setting up the attachment to gage the position of the saddle, it is necessary for the operator before placing the micrometer gage 87 in the holder 84 as shown in Fig. 1, to move the detent 94 from the inoperative position shown in dot-and-dash lines in Fig. 5, to the vertical full line position in the path of the set screw 98. The micrometer gage is now placed under the nib 100 in the holder 84, and engages under the nib to lock the detent 94 in its vertical operating position, so that the saddle power feed is locked out of operation.

If it is desired to move the saddle by power without removing the attachment from the machine, this can be accomplished without danger to the attachment by first removing the micrometer and measuring units from the holder 84 and then swinging the detent 94 to the dot-and-dash position shown in Fig. 5.

The nature and scope of the invention having been indicated, and an embodiment of the invention having been specifically described, what is claimed is:

1. In a machine tool, the combination with a tool for operating upon the work, of a movable support for positioning the work with relation to the operating tool, a second support on which said first support is mounted to move, a power feed for said movable support, a hand feed for said movable support, and an attachment for positioning said movable support to locate the work with relation to the operating tool comprising two cooperating contact members mounted one on each of said supports, and a measuring device arranged to engage between and measure the distance between said contact members, said attachment being constructed and arranged when placed in operating position in the machine to lock said power feed out of operation.

2. In a machine tool the combination with a tool for operating upon the work, of a movable support for positioning the work with relation to the operating tool, a second support on which said first support is mounted to move, a power feed for said movable support, a hand feed for said movable support, an attachment for positioning said movable support to locate the work with relation to the operating tool comprising two cooperating contact members mounted one on each of said supports, a measuring device arranged to engage between and measure the distance between said contact members, a control member for said power feed engaged by said device when placed in operating position in the machine to positively lock said power feed out of operation.

3. In a machine tool the combination with a tool for operating upon the work, of a movable support for positioning the work with relation to the operating tool, a second support on which said first support is mounted to move, a power feed for said movable support, a hand feed for said movable support, an attachment for positioning said movable support to locate the work with relation to the operating tool comprising two cooperating contact members mounted one on each of said supports, a measuring device arranged to engage between and measure the distance between said contact members, and control means for said power feed engaged by said attachment when in operative position to lock said power feed out of operation.

4. In a machine tool the combination with a tool for operating on the work, of a movable support for positioning the work with relation to the operating tool, a second support on which said first support is mounted to move, a power feed for said movable support, manually operable control mechanism for said power feed, a hand feed for said movable support, and an attachment for positioning said movable support to locate the work with relation to the operating tool comprising a contact member mounted on the movable support, means for supporting said cooperating contact member in a predetermined position on said second support, and a control member for said power feed engaged by said contact member to lock said power feed out of operation.

5. In a machine tool the combination with a work operating tool, of a movable support for positioning the work with relation to the operating tool, a support on which said movable support is mounted to move, a power feed for said movable support, a hand feed for said movable support, a hand control lever for operating said power feed having neutral and operating positions, and an attachment comprising a measuring device and two cooperating contact members mounted one on each of said supports and arranged to engage with opposite ends of said measuring device, one of said contact members being arranged when mounted on the machine to engage with and maintain the power feed lever in neutral position.

6. A milling machine having in combinaton with a work operating tool, a table, saddle and knee mounted one on another and movable in a plurality of paths, power feeds for each of said supports, a power feed control lever movable in one direction to connect the saddle feed, and in another direction to connect the knee feed, a hand operated feed for moving the saddle, and an attachment for positioning the saddle comprising a measuring device and two cooperating contact members mounted respectively on the saddle and on the knee and arranged to engage with opposite ends of said measuring device, and connections engaged by said attachment when placed in operative position to lock said power feed lever against movement in a direction to operate said saddle power feed.

7. In a machine tool the combination with a tool for operating upon the work, of a movable support for positioning the work with relation to the operating tool, a second support on which said first support is mounted to move, a power feed for said movable support, a manual control means for said power feed, a hand feed for said movable support, an attachment for positioning the movable support to locate the work with relation to the operating tool comprising a measuring device and two cooperating contact members mounted one on each of said supports, and a bracket for securing one of said contact members to its support arranged in the form of a yoke to engage with and lock said control lever in neutral position.

8. In a machine tool the combination with a tool for operating upon the work, of a movable support for positioning the work with relation to the operating tool, a second support on which said first support is mounted to move, a power feed for said movable support, a manual control lever for said power feed, a hand feed for said movable support, an attachment for positioning the movable support to locate the work with relation to the operating tool comprising two cooperating contact members mounted one on each of said supports, a measuring device comprising one or more measuring bars, a holder on which said bars are removably supported to engage between said contact members, and a detent member adapted to engage with said power feed actuating lever to lock said power feed out of operation and arranged to be engaged by and maintained in locking position by engagement with a measuring bar supported on the holder.

9. In a machine tool the combination with a tool for operating upon the work, of a movable support for positioning the work with relation to the operating tool, a second support on which said first support is mounted to move, a power feed for said movable support, a control mechanism for said power feed, a hand operated feed for said movable support, an attachment for positioning the movable support to locate the work with relation to the operating tool comprising two cooperating contact members mounted one on each of said supports, a measuring device comprising one or more measuring bars, a holder on which said bars are removably supported to engage between said contact members, a pivoted detent member arranged for a vertical position of said member to lock said control mechanism in neutral position, and an offset nib formed on said detent member overlying the holder adapted to be engaged by a bar supported in the holder to maintain said detent member in locking position.

10. In a machine tool the combination with a tool for operating upon the work, of a movable support for positioning the work with relation to the operating tool, a second support on which said first support is mounted to move, a power feed for said movable support, a hand operated feed for said movable support, an attachment for positioning the movable support to locate the work with relation to the operating tool comprising two cooperating contact members mounted one on each of said supports, a measuring device comprising one or more measuring bars, a holder on which said bars are removably supported to engage between said contact members, and a control member for said power feed engaged by a bar supported in the holder to lock said power feed out of operation.

11. In a machine tool the combination with a tool for operating upon the work, of a movable support for positioning the work with relation to the operating tool, a second support on which said first support is mounted to move, a power feed for said movable support, a hand operated feed for said movable support, an attachment for positioning the movable support to locate the work with relation to the operating tool comprising two cooperating contact members mounted one on each of said supports, a measuring device comprising one or more measuring bars, a holder on which said bars are removably supported to engage between said contact members, and controlling means for said power feed engaged by a bar in said holder to lock said power feed out of operation.

BENJAMIN P. GRAVES.
ARTHUR F. BENNETT.